United States Patent
Griffin

(10) Patent No.: US 10,600,113 B2
(45) Date of Patent: *Mar. 24, 2020

(54) METHODS AND SYSTEMS FOR STOREFRONT GENERATION

(71) Applicant: eBay Inc., San Jose, CA (US)

(72) Inventor: Kent Griffin, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,605

(22) Filed: Dec. 4, 2018

(65) Prior Publication Data

US 2019/0108577 A1 Apr. 11, 2019

Related U.S. Application Data

(63) Continuation of application No. 14/986,042, filed on Dec. 31, 2015, now Pat. No. 10,147,133, which is a
(Continued)

(51) Int. Cl.
*G06Q 30/00* (2012.01)
*G06Q 30/06* (2012.01)
(Continued)

(52) U.S. Cl.
CPC ....... *G06Q 30/0641* (2013.01); *G06Q 10/087* (2013.01); *G06Q 20/322* (2013.01); *G06Q 30/0601* (2013.01)

(58) Field of Classification Search
CPC ................................................. G06Q 30/06–08
(Continued)

(56) References Cited

U.S. PATENT DOCUMENTS 5,946,489 A 8/1999 Yellin et al.
6,263,352 B1 * 7/2001 Cohen .................... G06F 17/21
709/203

(Continued)

FOREIGN PATENT DOCUMENTS

WO 2012/138490 A1 10/2012

OTHER PUBLICATIONS

Australian Patent Examination Report No. 1, as issued in connection with Australian Application No. 2012240488, dated Jan. 21, 2015, 5 pgs.
(Continued)

*Primary Examiner* — Ethan D Civan
(74) *Attorney, Agent, or Firm* — Merchant & Gould P.C.

(57) ABSTRACT

An embodiment includes a system comprising an initialization module and a platform module. The initialization module provides an initialization interface to a merchant that receives an indication from the merchant to initialize creation of a storefront application. The platform module receives a selection of mobile phone device operating systems; accesses stored templates from a template database, and maps elements in the stored templates to portions of source code to generate sets of operating system-specific source code. The stored templates correspond to the selected mobile phone device operating systems. The stored templates include source code used to implement portions of the storefront application on a mobile phone device operating system. When compiled, the sets of operating system-specific source code become versions of the storefront application executable by a respective one of mobile phone device operating systems.

20 Claims, 10 Drawing Sheets

Related U.S. Application Data continuation of application No. 13/081,211, filed on Apr. 6, 2011, now Pat. No. 9,262,778.

(51) Int. Cl.
*G06Q 10/08* (2012.01)
*G06Q 20/32* (2012.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,291,408 B1 | 10/2012 | Czymontek | |
| 9,262,778 B2* | 2/2016 | Griffin | G06Q 30/0601 |
| 10,147,133 B2* | 12/2018 | Griffin | G06Q 30/0601 |
| 2001/0049672 A1 | 12/2001 | Moore et al. | |
| 2003/0009747 A1* | 1/2003 | Duran | G06F 8/20 |
| | | | 717/137 |
| 2004/0133595 A1 | 7/2004 | Black | |
| 2011/0078678 A1 | 3/2011 | Matthews | |
| 2012/0260199 A1 | 10/2012 | Griffin | |
| 2016/0117761 A1 | 4/2016 | Griffin | |

OTHER PUBLICATIONS

Response to Examination Report No. 1 filed Sep. 25, 2015 for Australian Application No. 2012240488, dated Jan. 21, 2015, 19 pgs.
Australian Patent Examination Report No. 2, as issued in connection with Australian Application No. 2012240488, dated Oct. 12, 2015, 6 pgs.
Response to Examination Report No. 2 filed Nov. 27, 2015 for Australian Application No. 2012240488, dated Oct. 12, 2015, 20 pgs.
Canadian Office Action, as issued in connection with Canadian Application No. 2,832,043, dated Mar. 18, 2015, 4 pgs.
Response to Office Action filed Sep. 16, 2015 for Canadian Application No. 2,832,043, dated Mar. 18, 2015, 11 pgs.
Canadian Office Action, as issued in connection with Canadian Application No. 2,832,043, dated Mar. 3, 2016, 3 pgs.
Response to Office Action filed Aug. 4, 2016 for Canadian Application No. 2,832,043, dated Mar. 3, 2016, 3 pgs.
Canadian Office Action, as issued in connection with Canadian Application No. 2,832,043, dated Jan. 10, 2017, 3 pgs.
Response to Office Action filed Jul. 5, 2017 for Canadian Application No. 2,832,043, dated Jan. 10, 2017, 10 pgs.
Canadian Office Action, as issued in connection with Canadian Application No. 2,832,043, dated Nov. 27, 2017, 3 pgs.
Response to Office Action filed May 28, 2018 for Canadian Application No. 2,832,043, dated Nov. 27, 2017, 3 pgs.
Korean Preliminary Rejection, as issued in connection with Korean Application No. 2013-7029355, dated Apr. 28, 2015, 4 pgs.
Response to Office Action filed Jun. 29, 2015 for Korean Application No. 10-2013-7029355, dated Apr. 28, 2015, 24 pgs.
Korean Preliminary Rejection, as issued in connection with Korean Application No. 2016-7004266, dated May 13, 2016, 7 pgs.
Response to Office Action filed Jul. 11, 2016 for Korean Application No. 10-2016-7004266, dated May 13, 2016, 35 pgs.
International Search Report and Written Opinion, as issued in connection with International Patent Application No. PCT/US2012/030374, dated Jun. 22, 2012, 7 pgs.

Non-Final Office Action received for U.S. Appl. No. 13/081,211, dated Aug. 20, 2013, 12 pgs.
Response to Non-Final Office Action filed Dec. 20, 2013, for U.S. Appl. No. 13/081,211, dated Aug. 20, 2013, 11 pgs.
Final Office Action received for U.S. Appl. No. 13/081,211, dated Mar. 21, 2014, 14 pgs.
Response to Final Office Action filed on May 21, 2014 for U.S. Appl. No. 13/081,211, dated Mar. 21, 2014, 11 pgs.
Applicant Initiated Interview Summary received for U.S. Appl. No. 13/081,211, dated May 16, 2014, 3 pgs.
Advisory Action received for U.S. Appl. No. 13/081,211, dated Jun. 2, 2014, 3 pgs.
Response to Final Office Action filed Jun. 19, 2014 for U.S. Appl. No. 13/081,211, dated Mar. 21, 2014, 11 pgs.
Non-Final Office Action received for U.S. Appl. No. 13/081,211, dated Jul. 31, 2014, 15 pgs.
Response to Non-Final Office Action filed Dec. 1, 2014 for U.S. Appl. No. 13/081,211, dated Jul. 31, 2014, 13 pgs.
Final Office Action received for U.S. Appl. No. 13/081,211, dated Dec. 18, 2014, 15 pgs.
Applicant Initiated Interview Summary received for U.S. Appl. No. 13/081,211, dated Jan. 27, 2015, 3 pgs.
Response to Final Office Action filed Apr. 17, 2015 for U.S. Appl. No. 13/081,211, dated Dec. 18, 2014, 12 pgs.
Advisory Action received for U.S. Appl. No. 13/081,211, dated Apr. 29, 2015, 3 pgs.
Response to Final Office Action filed May 18, 2015 for U.S. Appl. No. 13/081,211, dated Dec. 18, 2014, 13 pgs.
Non-Final Office Action received for U.S. Appl. No. 13/081,211, dated Jun. 17, 2015, 16 pgs.
Response to Non-Final Office Action filed Sep. 17, 2015 for U.S. Appl. No. 13/081,211, dated Jun. 17, 2015, 18 pgs.
Applicant Initiated Interview Summary received for U.S. Appl. No. 13/081,211, dated Sep. 24, 2015, 3 pgs.
Notice of Allowance received for U.S. Appl. No. 13/081,211, dated Nov. 5, 2015, 5 pgs.
First Action Interview Pre-Interview Communication received for U.S. Appl. No. 14/986,042, dated Nov. 30, 2017, 5 pgs.
First Action Interview Office Action Summary received for U.S. Appl. No. 14/986,042, dated Jan. 23, 2018, 5 pgs.
Response to First Action Interview Office Action Summary filed Mar. 23, 2018 for U.S. Appl. No. 14/986,042, dated Jan. 23, 2018, 3 pgs.
Notice of Allowance received for U.S. Appl. No. 14/986,042, dated Jul. 30, 2018, 7 pgs.
BHPhotoVideo (Jan. 15, 2006, http://web.archive.org/liveweb/http://www.bhphotovideo.com/bnb/controller/home;Jsessionid=DySSxwP7n4!211993408?O=RootPage.jsp&A=getpage&Q=holidayschedule.jsp), 2 pgs.
Regtien, M., 'Only for Seniors?? Just5 Phone CP09—Reviewed', [retrieved from internet on Oct. 2, 2015] <URL: http://web.archive.org/web/20100707041554/http://www.digitalreviews.net/reviews/mobile-devices/only-for-seniors-just5-phone-cp09-reviewed.html>published on Jul. 7, 2010 as per Wayback Machine, 4 pgs.
Amendment after Allowance filed on Apr. 29, 2019 for Canada Application No. 2,832,043, dated Oct. 29, 2018, 13 pages.
International Preliminary Report on Patentability received for PCT Application No. PCT/US2012/030374, dated Oct. 17, 2013, 6 pages.
Notice of Allowance Received for U.S. Appl. No. 14/986,042 dated Apr. 23, 2018, 8 pages.
Response to Pre-Interview Communication filed on Dec. 29, 2017, for U.S. Appl. No. 14/986,042, dated Nov. 30, 2017, 11 pages.

* cited by examiner

Step 2 of 2: Publish your Storefront

Choose the format in which you are publishing your storefront using then checkboxes below. For HTML widgets, you will need to copy and paste the code to your chosen website/other.

◀ Return to Step 1 – Modify your Storefront

Select which platforms you would like to publish your store:

☐ iPhone/iOS Devices
☐ Android
☐ HTML

[PUBLISH]

If HTML chosen, copy and paste the code from below:

```
<object classid="clsid:D27CDB6E-AE6D-11cf96B8-444553540000" codebase="http://download.macromedia.com/pub/shockwave/cabs/flash/swflash.cab#version=7,0,19,0" width="215" height="355"><param name="movie" value="htp://storefront.paypallabs.com/store/prtablestore.swf?store_id=570090e08651012dffe2000d60d4b7b8"/><param name="quality" value="high"/><param name="store_id=570090e08651012dffe2000d60d4b7b8"/><param name="allowScriptAccess" value="always"/><param name="allowNetworking" value="all"/><embed allowScriptAccess="always" allowNetworking="all" src="http://storefront.paypallabs.com/store/portablestore.swf?store_id=
```

*FIG. 9*

METHODS AND SYSTEMS FOR STOREFRONT GENERATION

CROSS-REFERENCE TO RELATED APPLICATIONS

This application is a continuation of U.S. patent application Ser. No. 14/986,042, filed on Dec. 31, 2015, now U.S. Pat. No. 10,147,133, issued on Dec. 4, 2018; which is a continuation of U.S. patent application Ser. No. 13/081,211, filed on Apr. 6, 2011, now U.S. Pat. No. 9,262,778, issued on Feb. 16, 2016; the disclosures of both of these patents are incorporated by reference herein.

TECHNICAL FIELD

The present application relates generally to the technical field of data processing and, in one specific example, to generating a storefront.

BACKGROUND

Online merchants provide online stores where the merchants sell their goods to consumers. A merchant may set up a storefront accessible via a website or via an application. To provide an application, the merchant may have to hire a programmer or code the application himself.

BRIEF DESCRIPTION OF THE DRAWINGS

Some embodiments are illustrated by way of example and not limitation in the figures of the accompanying drawings in which:

FIG. 5 is an example interface for selecting the appearance of a mobile storefront according to an example embodiment.

FIG. 8 is an example interface for providing shipping rules to a mobile storefront according to an example embodiment.

FIG. 9 is an example interface for publishing a mobile storefront according to an example embodiment.

DETAILED DESCRIPTION

Example methods and systems to generate a mobile storefront are described. In the following description, for purposes of explanation, numerous specific details are set forth in order to provide a thorough understanding of example embodiments. It will be evident, however, to one skilled in the art that the present invention may be practiced without these specific details.

Online merchants publish a mobile storefront where buyers can browse items for sale and purchase those items using a mobile device. The mobile device may be a smartphone, tablet, or other connected user devices such as a television set or set-top box. The systems and methods provided herein allow a merchant to generate a mobile storefront that can be downloaded by the user of the mobile device. In various embodiments, the merchant is automatically provided source code to modify, add-to, or publish directly to the users.

Figure 1:
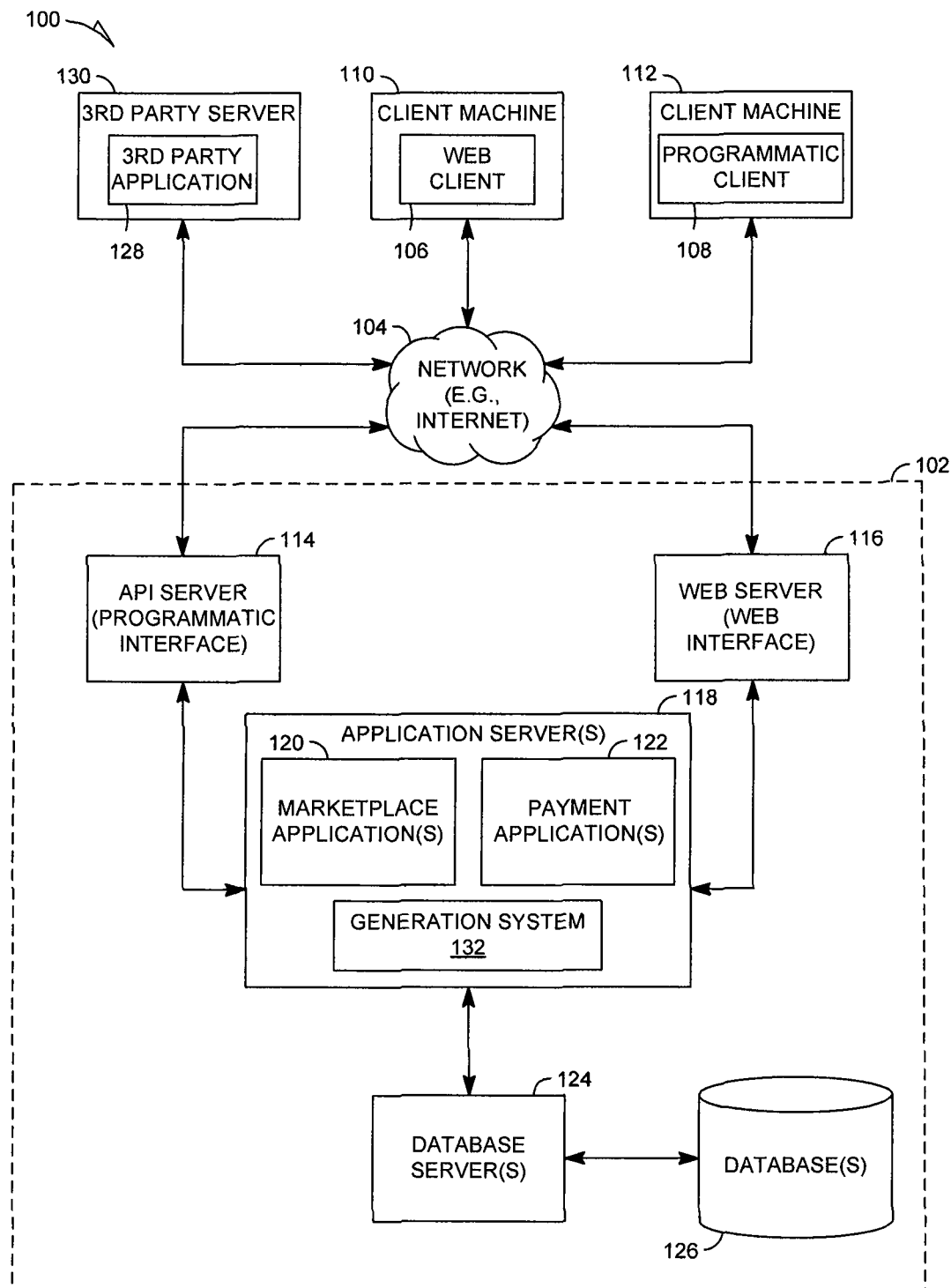
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126. The application servers 118 may further host a generation system 132 that generates mobile storefronts.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is of course not limited to such an architecture, and may equally find application in a distributed, or peer-to-peer, architecture system, for example. The various marketplace and payment applications 120 and 122 may also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
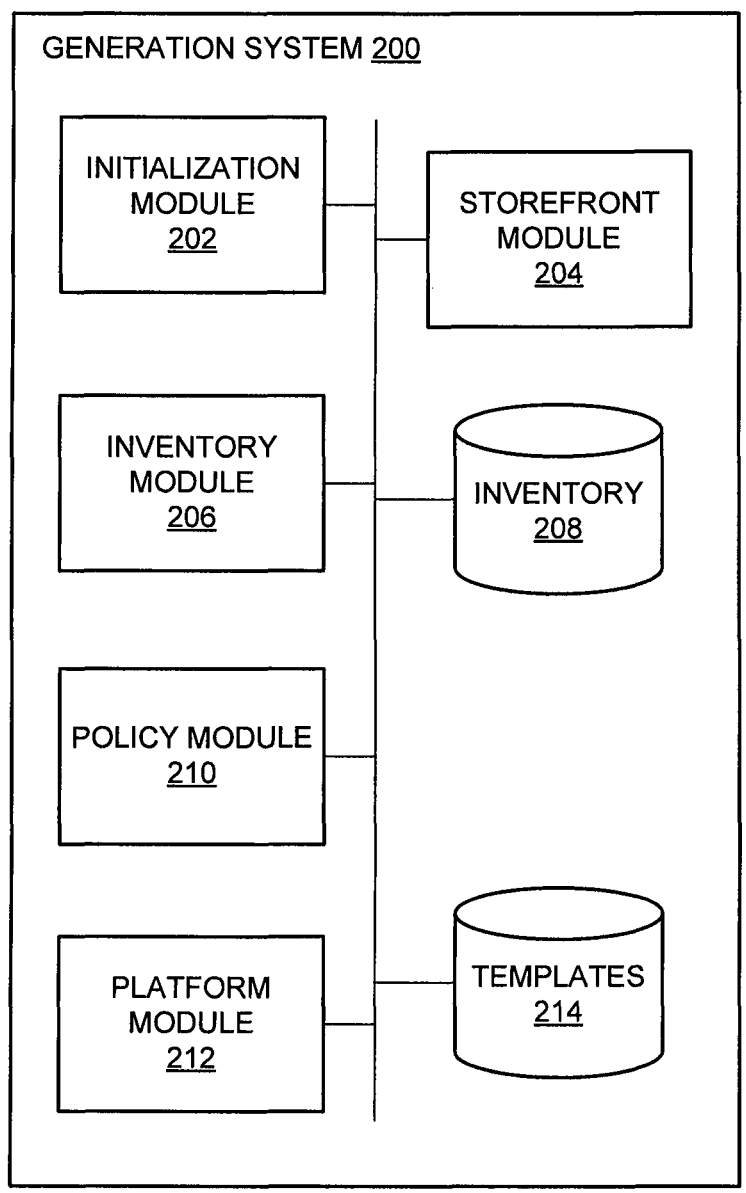
FIG. 2 is a block diagram of an example generation system according to various embodiments.

FIG. 2 is a block diagram of an example generation system 200 according to various embodiments. The generation system 200 may be an example of generation system 132. The example generation system 200 may be implemented in hardware, software, or using a combination of hardware and software. In some instances, the generation system 200 may be implemented using one or more processors. The generation system 200 comprises a plurality of modules implemented in hardware, software, or a combination thereof. The modules may, respectively, use or have one or more processors. The generation system 200 may be accessible via a website as shown herein. In other embodiments, the generation system 200 may be accessible via, for example, a mobile application, a widget, or a computer application.

An initialization module 202 is configured to identify a merchant from among a plurality of merchants for whom to generate a storefront. The merchant may be identified using information provided by the merchant such as a login name, a token, a password, or the like. The merchant may, alternatively, be identified using other information such as a cookie, a device identifier, an IP address, or the like.

Figure 4:
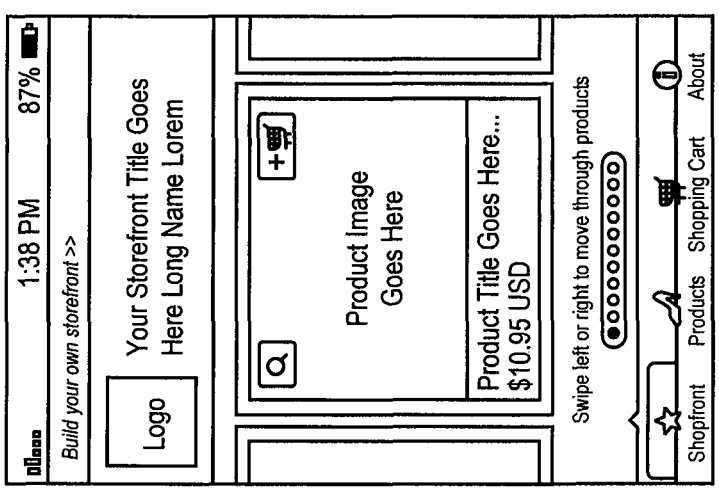
FIG. 4 is an example interface for initiating generation of a mobile storefront according to an example embodiment.

The initialization module 202 may further allow a merchant to establish one or more storefronts. The merchant may provide, via a user interface, a title to identify the storefront, a logo for the storefront, a currency accepted by the storefront, and a storefront status (e.g., open or closed). One example of an interface provided by the initialization module 202 is depicted in FIG. 4. The initialization module 202 may receive further information about the storefront such as, for example, seasonality, contact information, shipping location, acceptance of terms and conditions, reputation information of the merchant, billing information used to bill the merchant for the storefront, and the like.

Figure 5:
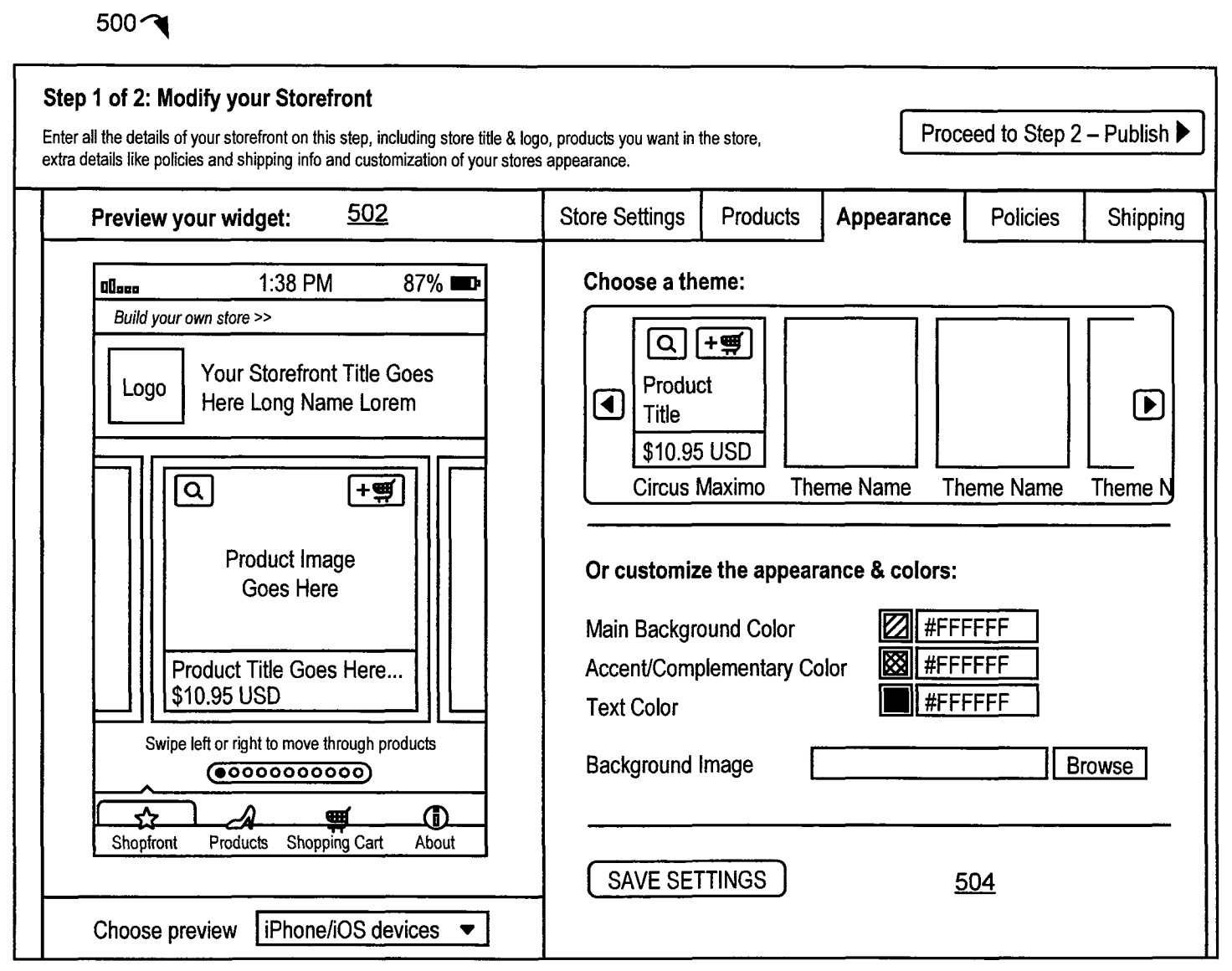

A storefront module 204 is configured to allow the merchant to specify an appearance of the storefront via a generation interface provided by the storefront module 204. An example of a generation interface is depicted in FIG. 5. The storefront module 204 may receive a selection of a graphical theme for the storefront from a plurality of graphical themes. In some instances, the merchant may upload a graphical theme to the storefront module 204. A graphical theme specifies a layout of objects within an interface provided by the storefront to users. The objects may include a storefront title or logo, images of products for sale, product titles, product descriptions, menu layout, elements selectable by the user to perform various actions, and the like. In some instances, the merchant may customize a selected theme by, for example, changing fonts, changing text style or font size, changing pattern or texture, changing a background image, or the like. In some instances, the merchant may upload objects such as logos, images, or product descriptions via the generation interface.

Figure 6:
FIG. 6 is an example interface for providing products to a mobile storefront according to an example embodiment.

An inventory module 206 is configured to receive and manage an inventory from the merchant that describes products for sale by the merchant. Examples of interfaces generated by the inventory module 206 are depicted in FIG. 6 and in FIG. 7. The inventory may be stored in an inventory database 208 for access by potential buyers and the merchant. In one embodiment, the inventory may be accessed by the inventory module 206 via an API (e.g., an API provided by the API server 114) from the inventory database 208. In some embodiments, the inventory module 206 may be accessed via an RSS feed or an upload of a spreadsheet. In some instances, a merchant may be able to edit, feature (i.e., showcase or highlight), or delete a product from the storefront. The inventory module 206 may provide default product settings changeable by the merchant for determining which products to feature on a home page of the storefront or for determining a course of action when one of the products sells out, when the quantity becomes too low, or if the product is not selling quickly.

A policy module 210 is configured to receive policies from the merchant that are enforced against the buyer. Examples of merchant policies may include pricing policies, dynamic pricing policies, shipping policies, payment policies, return policies, and the like. One example of an interface published by the policy module 210 directed to shipping policies is provided in FIG. 8. At least a portion of the policies may be received from the merchant in an "if-then" rule format.

A platform module 212 is configured to generate one or more executable applications based on the information provided by the merchant via the above described interfaces. The platform module 212 may generate source code, that when compiled, is executable within a particular mobile operating system. The source code includes human-readable program statements written in a high-level language that is not directly readable by a computer. When the source code is compiled into object code based on a selection of a platform or mobile operating system. Examples of platforms operating as mobile operating systems include iOS, Android, Windows Mobile, Blackberry, Palm, and the like. Other source code executable by more than one operating system, such as HTML code, may also be generated.

To generate the code, the platform module 212 may access one or more stored templates stored in a database such as templates database 214. The templates may include source code used to implement portions of the storefront. The templates may be separately generated for each platform. The source code within the templates is modifiable by the platform module 212. The platform module 212 may assemble and modify one or more of the stored templates to implement the storefront across multiple platforms as specified by the merchant. The template may be modified to include the merchant's selections. Based on the template selected by the platform module 212, the platform module 212 generates the source code of the application by mapping elements in the templates to modules of source code. For example, the inventory module 206 may exist in the source code, fill in with the necessary inventory, and then be published to the merchant.

Figure 3:
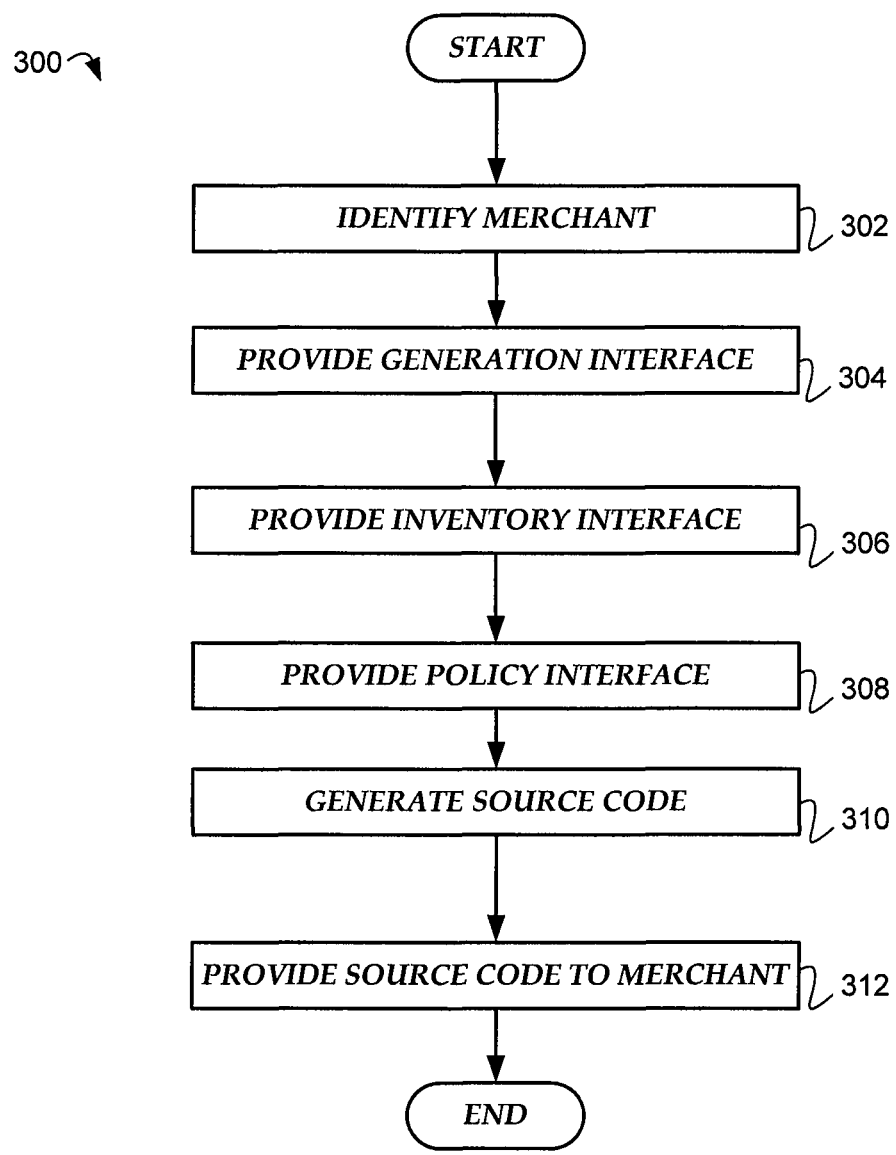
FIG. 3 is a flowchart of an example method of generating a mobile storefront according to various embodiments.

FIG. 3 is a flowchart of an example method 300 of generating a mobile storefront according to various embodiments. The method 300 may be performed by the generation system 200. In some instances, the method 300 may be performed by one or more processors within a cloud computing environment. The method 300 includes steps for providing one or more interfaces to the merchant, which the merchant can use to establish and maintain their mobile storefront. As used herein, a step of providing an interface may further comprise receiving input from the merchant via the interface and storing or processing the received input. As will be apparent, the steps of method 300 may be performed in various orders and are not limited to the order depicted in FIG. 3.

In a step 302, the merchant is identified from among a plurality of merchants by, for example, the initialization module 202. Step 302 may further comprise receiving a selection of a storefront from among a plurality of storefronts already created by the merchant. For example, the merchant may provide a login mechanism which identifies the merchant or storefront to the system. In some instances, a merchant may request creation of a new storefront in the step 302. Alternatively, the merchant may change a status of, or edit, an existing storefront to "open" or "closed." One example interface for creating or modifying the storefront is shown in FIG. 4.

In a step 304, a generation interface is provided to the merchant by the storefront module 204. The generation interface allows the merchant to select the appearance of the storefront using, for example, the generation interface of FIG. 5. If the storefront is being created by the merchant, a graphical theme may be selected. If the storefront is being modified, the graphical theme may be modified by the merchant using the generation interface or a new graphical theme may be selected for the storefront. The merchant may provide or select one or more customizations to customize the graphical theme. A customization may include a background color, an accent or complementary color, a text color, font, a text style or size, or a background image.

In a step 306, an inventory interface (see, e.g., FIG. 6) is provided to the merchant by the inventory module 206. The inventory interface may be configured to receive inventory information describing items for sale from the merchant. In some instances, the inventory may be accessed from a database maintained by the merchant, such as inventory database 208 or another inventory database separate from the generations system 200. The inventory may be accessed via an API command, RSS feed, uploaded spreadsheet, or may be added item by item by the merchant (see, e.g., FIG. 7). In instances where the merchant has more than one storefront, the inventory is associated with the storefront selected in step 302.

The inventory interface may further allow the merchant to provide one or more inventory settings. The inventory setting may include products that should be shown on an initial interface provided to the user when the application is first executed by the user (e.g., a "home screen"). The inventory setting may also comprise an action to perform if a particular item sells out, the quantity available becomes too low or if there is a surplus of the item.

In a step 308, a policy interface is provided to the merchant by the policy module 210. The policy interface allows the merchant to establish storefront policies. Examples of storefront policies include pricing policies, dynamic pricing policies, shipping policies, payment policies, return policies, and the like. An example of a policy interface targeted to shipping policies is provided in FIG. 8.

In a step 310, the source code is generated by the platform module 212. The source code, when executed on a user device, displays the storefront to the user and allows a user to bid on or purchase one or more items for sale using the user device. The source code is generated according to the input received from the merchant via the interfaces provided in steps 304, 306, and 308. The source code may be generated using one or more templates. More than one set of source code may be generated for the storefront. The sets of source code may be generated for various platforms of user devices.

In some instances, not all of the steps 304, 306, and 308 may be required. In those instances, pre-saved settings or default settings may be used to generate the source code.

In a step 312, the source code is provided to the merchant. The source code is editable by the merchant. After the source code is given to the merchant, the merchant may customize the source code to meet his needs or add add-ons (such as a tax-calculator service). The merchant may further compile the source code into an executable application and publish the executable application to one or more users. An executable application may be provided by the generation system 200 to the merchant.

FIG. 4 is an example interface 400 for initiating generation of a mobile storefront according to an example embodiment. The interface 400 includes a preview screen 402 that provides a preview of an interface within the proposed storefront that will be displayed to a user. The preview screen 402 may further include an option to choose a preview of an interface as viewed by a potential buyer according to a platform of the user device. The interface 400 also comprises an initialization interface 404. The initialization interface 404 includes an input field (reference #) for a storefront title and a storefront logo. The merchant may also specify a currency associated with the storefront and a storefront status using the interface 400. The merchant may even add a message displayed to users if the storefront status is set to "closed." For example, the merchant may indicate that the store is closed for the holidays and specify the dates of closure. In some instances, the merchant may specify the behavior of having a closed store. For example, a closed store may accept payments and ship items, may not accept payments, may accept payments but delay shipping, or require extra payment to expedite an order while closed.

FIG. 5 is an example generation interface 500 for selecting the appearance of a mobile storefront according to an example embodiment. The generation interface 500 includes a preview screen 502 with an option to select a platform. The generation interface 500 also includes a generation interface 504. The generation interface 504 includes one or more selectable graphical themes and one or more options to customize the appearance and colors of the storefront. For example, one theme may have a particular format that allows display of an image, product name, title, description, and price. Another example of a theme may allow for a main image and thumbnails for further images. The merchant may scroll through the predefined themes to select a theme. The customizations may be used to generate a new graphical theme or to modify an existing graphical theme.

FIG. 6 is an example interface 600 for providing products to a mobile storefront according to an example embodiment. The interface 600 includes a preview screen 602 with an option to select a platform. The preview screen 602 includes a product list as opposed to showcasing one product at a time. The user may select a product from the product list to view additional information about the product. The user may purchase the item directly from the product list.

The interface 600 also includes an inventory interface 604. The inventory interface 604 allows the merchant to provide a description of the items for sale by the merchant. The descriptions of the items in the inventory interface 604 may include a title, a price, and a quantity available. The inventory interface 604 includes an option to edit, feature, or delete an item from the inventory. The inventory interface 604 further includes options for the merchant to set an item to be featured on the home screen of the application by selecting the star icon and to set an action to take if an item sells out.

Figure 7:
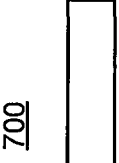
FIG. 7 is an example interface for adding a product to a mobile storefront according to an example embodiment.

FIG. 7 is an example interface 700 for adding a product to a mobile storefront according to an example embodiment. The interface 700 may be initiated when the merchant selects the button labeled "+ new product" on the interface. A pop-up screen (interface 700) may be provided for the manual input. The interface 700 includes an option to add a product title, import an image of the product, add a description of the product, provide a price of the product, and provide a quantity (labeled "inventory") of items available for sale. Once the product is saved it appears in the preview screen 602 or the interface 600.

Figure 8:
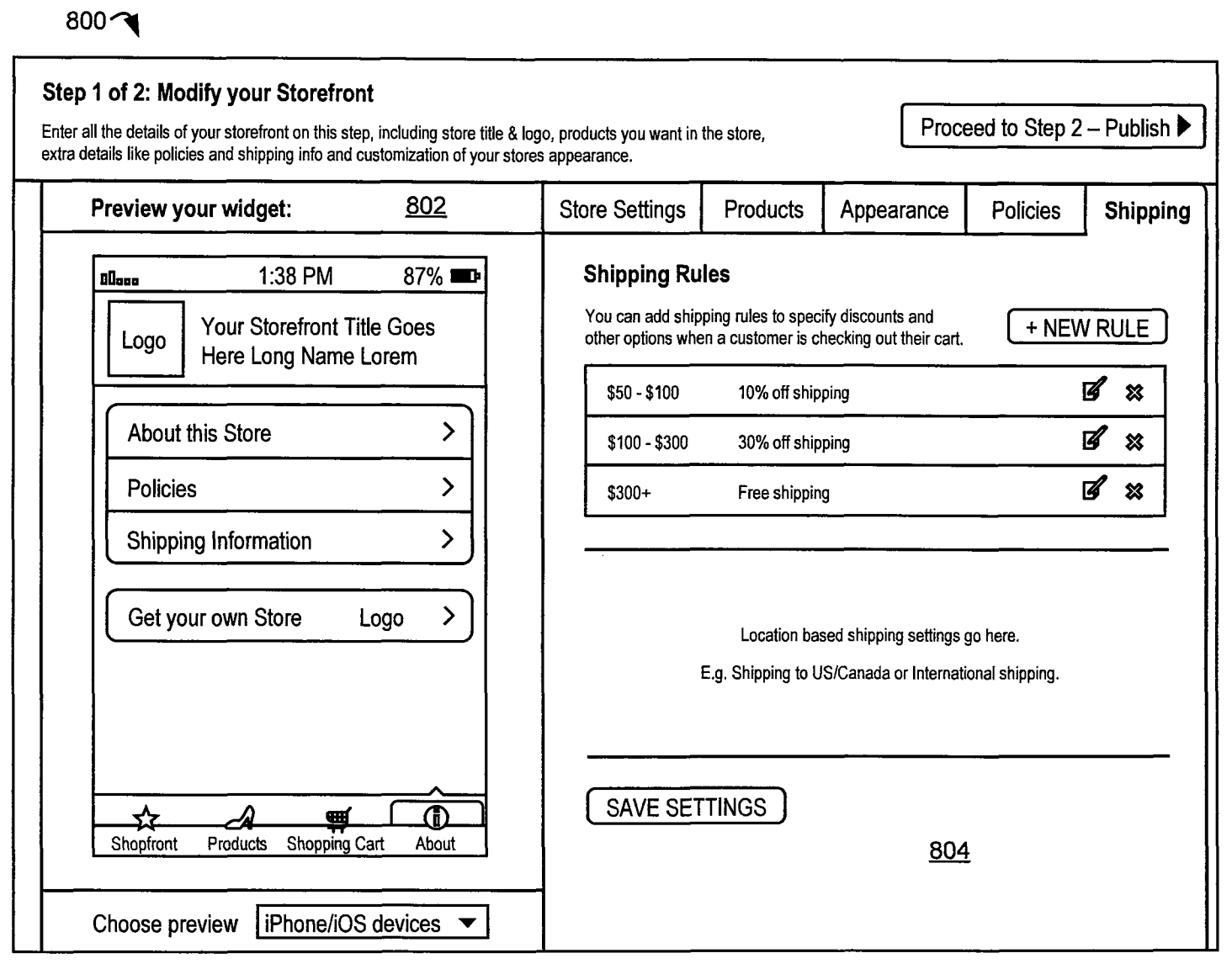

FIG. 8 is an example interface 800 for providing shipping policies to a mobile storefront according to an example embodiment. Additional interfaces may be provided for receiving other policies from the merchant. The interface 800 includes a preview screen 802 with an option to select a platform. The interface 800 further comprises a shipping interface 804. The shipping interface 804 allows a merchant to add, modify, or delete a shipping policy.

FIG. 9 is an example interface 900 for publishing a mobile storefront according to an example embodiment. The interface 900 includes options for a merchant to specify one or more platforms (including HTML) to publish the storefront. For example, the interface 900 provides default platforms (e.g., iPhone, Android, HTML) from which the merchant may select. Alternatively, the merchant may be allowed to indicate a different platform. In the case of a HTML platform, a code or flash object may be generated and provided to the merchant. The merchant can then copy the code to their website or otherwise publish the code to potential buyers.

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 10:
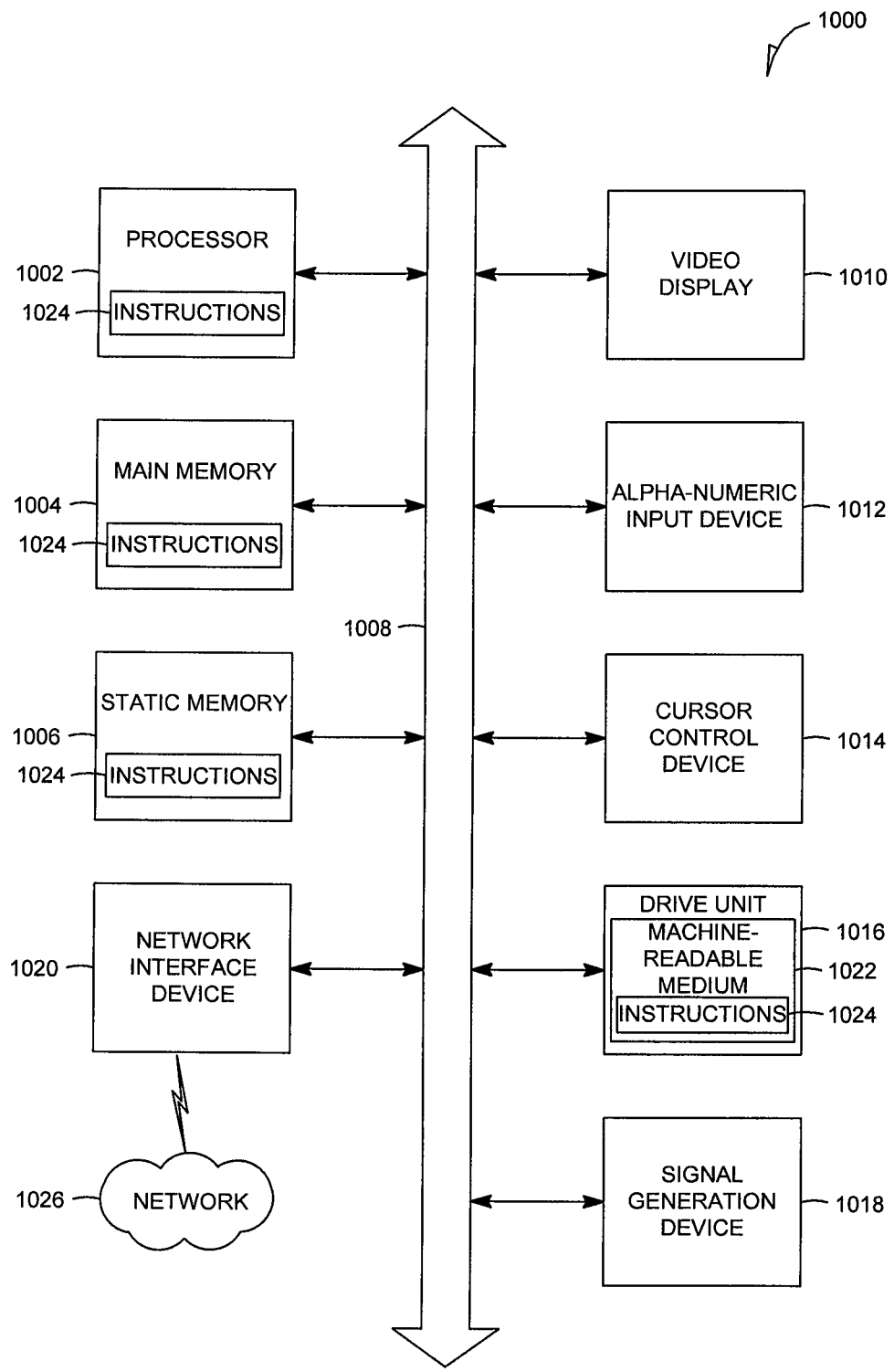
FIG. 10 is a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein.

The software 1024 may also reside, completely or at least partially, within the main memory 1004 and/or within the processor 1002 during execution thereof by the computer system 1000, the main memory 1004 and the processor 1002 also constituting machine-readable media. The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that storefront the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Thus, a method and system to generate a storefront have been described. Although the present invention has been described with reference to specific example embodiments, it will be evident that various modifications and changes may be made to these embodiments without departing from the broader spirit and scope of the invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   a non-transitory computer-readable medium having instructions stored thereon;
   one or more hardware processors communicatively coupled to the non-transitory computer-readable medium, the one or more hardware processors configured to execute the instructions to cause a machine to perform operations comprising:
   obtaining an indication to create a storefront application and a selection of one or more of a plurality of operating systems;
   accessing one or more stored templates corresponding to the selected operating systems, wherein each of the stored templates include source code that is used to implement portions of the storefront application on at least one of the plurality of operating systems; and
   generating one or more sets of operating system-specific source code configured to become versions of the storefront application that are executable by a respective one of the plurality of operating systems in response to being compiled.

2. The system of claim 1, wherein the operations further comprise:
   receiving inventory information describing items for sale;
   receiving an inventory setting, the inventory setting comprising an action to perform if a particular item sells;
   accessing an inventory database via an application programming interface;
   obtaining the inventory information from the inventory database; and mapping at least a portion of the obtained inventory information to each of the one or more sets of operating system-specific source code.

3. The system of claim 1, wherein the operations further comprise: causing displaying of a preview version of the storefront application on a display, the preview version corresponding to one of the plurality of operating systems.

4. The system of claim 3, wherein:
the operations further comprise receiving a second indication of an appearance of the storefront application; and
the second indication of the appearance of the storefront application includes a selection of at least one of a background color, an accent color, a text color, a font, a text size, a text style, or a background image.

5. The system of claim 3, wherein the operations further comprise:
receiving a modification to the preview version of the storefront application, and
modifying, in accordance with the modification, each of the one or more respective stored templates specific to each operating system of the plurality of operating systems.

6. The system of claim 1, wherein the operations further comprise:
providing a policy interface; and
receiving policies of the storefront application.

7. The system of claim 1, wherein the stored templates include a first template with a first setting for a first one of the plurality of operating systems and a second template with a second setting for a second one of the plurality of operating systems.

8. A method comprising:
receiving, by one or more computing systems, an indication to create a storefront application and a selection of one or more of a plurality of operating systems;
accessing, by the one or more computing systems, one or more stored templates that correspond to the selected operating systems, wherein each of the stored templates include source code used to implement portions of the storefront application on at least one of the plurality of operating systems; and
generating, by the one or more computing systems, one or more sets of operating system-specific source code, the one or more sets of operating system-specific source code configured to become versions of the storefront application that are executable by a respective one of the plurality of operating systems in response to being compiled.

9. The method of claim 8, further comprising:
obtaining inventory information describing items for sale; and
mapping at least a portion of the obtained inventory information,
wherein the one or more sets of operating system-specific source code further include mapped inventory information.

10. The method of claim 8, further comprising:
causing display of a preview version of the storefront application in a generation interface, wherein the preview version corresponds to one of the plurality of operating systems;
receiving a modification to the preview version of the storefront application; and
modifying, in accordance with the modification, each of the one or more respective stored templates specific to each operating system.

11. The method of claim 10, further comprising receiving, in the generation interface, a selection of an appearance of the storefront application, wherein the appearance includes one or more or a combination of:
a graphical theme;
a background color;
an accent color;
a text color;
a font;
a text size;
a text style; and
a background image.

12. The method of claim 8, further comprising receiving policies of the storefront application via a policy interface.

13. The method of claim 8, wherein the stored templates include a first template for a first one of the plurality of operating systems and a second template for a second one of the plurality of operating systems.

14. The method of claim 8, further comprising mapping an element in the accessed stored templates to a portion of the source code, wherein the one or more sets of operating system-specific source code include the mapped elements of the stored templates.

15. The method of claim 8, further comprising identifying a merchant for whom to generate the storefront application based on information, wherein the information includes a login name, a token, a password, a cookie, a device identifier, or an internet protocol (IP) address.

16. The method of claim 8, wherein the plurality of operating systems includes one or more operating systems and hypertext markup language (HTML) code.

17. The method of claim 8, further comprising providing to a user the one or more sets of operating system-specific source codes to enable customization by the user.

18. A non-transitory computer-readable medium having instructions embodied thereon, the instructions executable by one or more processors to perform or control performance of operations comprising:
obtaining, by the one or more processors, an indication to create a storefront application and a selection of one or more of a plurality of operating systems;
accessing, by the one or more processors, one or more stored templates corresponding to the selected operating systems, wherein each of the stored templates include source code that is used to implement portions of the storefront application on at least one of the plurality of operating systems; and
generating, by the one or more processors, one or more sets of operating system-specific source code configured to become versions of the storefront application that are executable by a respective one of the plurality of operating systems in response to being compiled.

19. The non-transitory computer-readable medium of claim 18, wherein the operations further comprise:
receiving inventory information describing items for sale; and
mapping at least a portion of the received inventory information,
wherein the one or more sets of operating system-specific source code further include mapped inventory information.

20. The non-transitory computer-readable medium of claim 18, wherein the operations further comprise:
causing display of a preview version of the storefront application in a generation interface, wherein the preview version corresponds to one of the plurality of operating systems;

receiving a modification to the preview version of the storefront application; and modifying each of the one or more respective stored templates specific to each operating system in accordance with the modification.

* * * * *